Aug. 8, 1939.　　　A. LAUKHUFF　　　2,168,415
CUTTING MACHINE
Filed Oct. 29, 1934　　　8 Sheets-Sheet 1
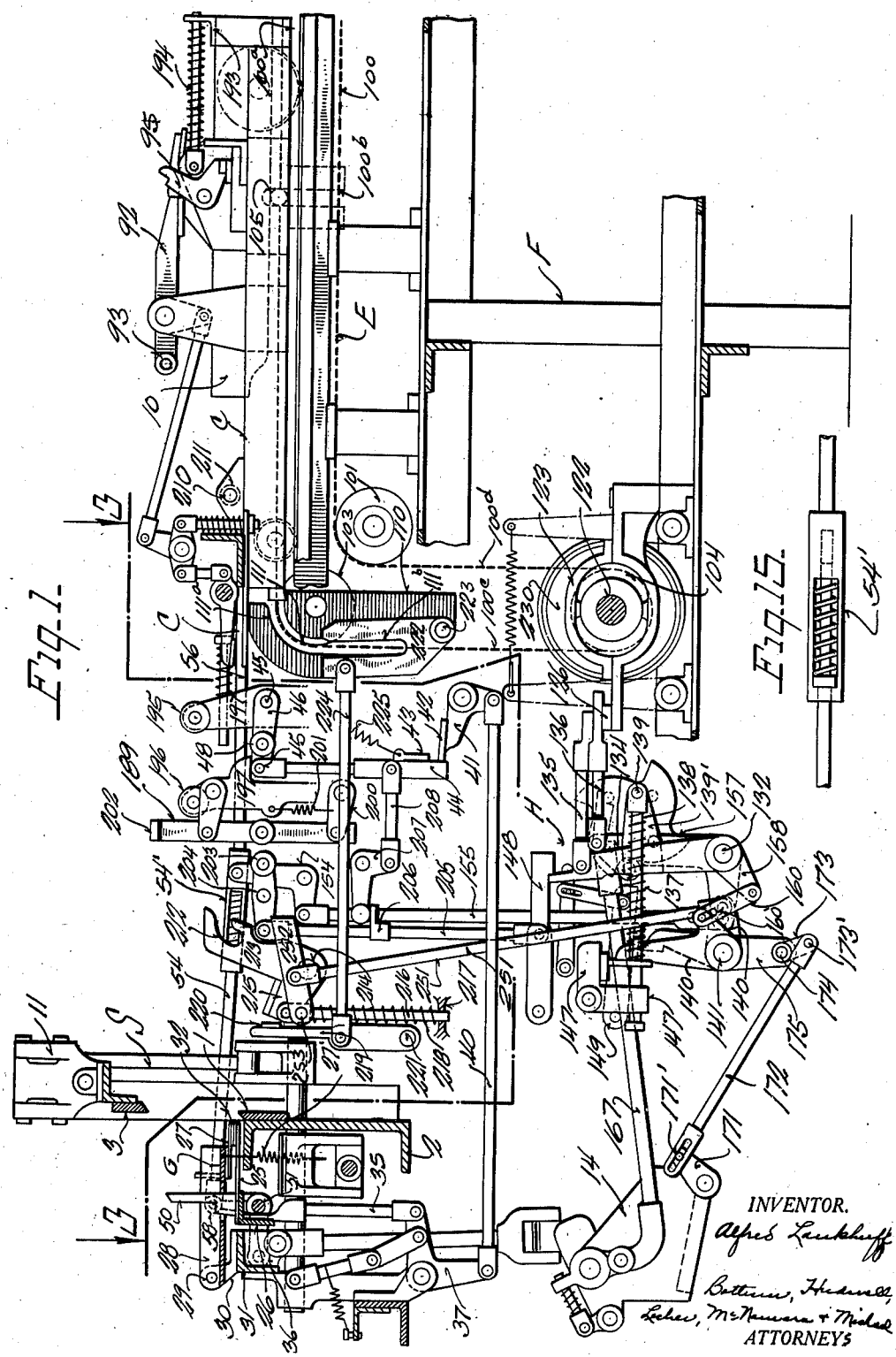
INVENTOR.
Alfred Laukhuff
ATTORNEYS

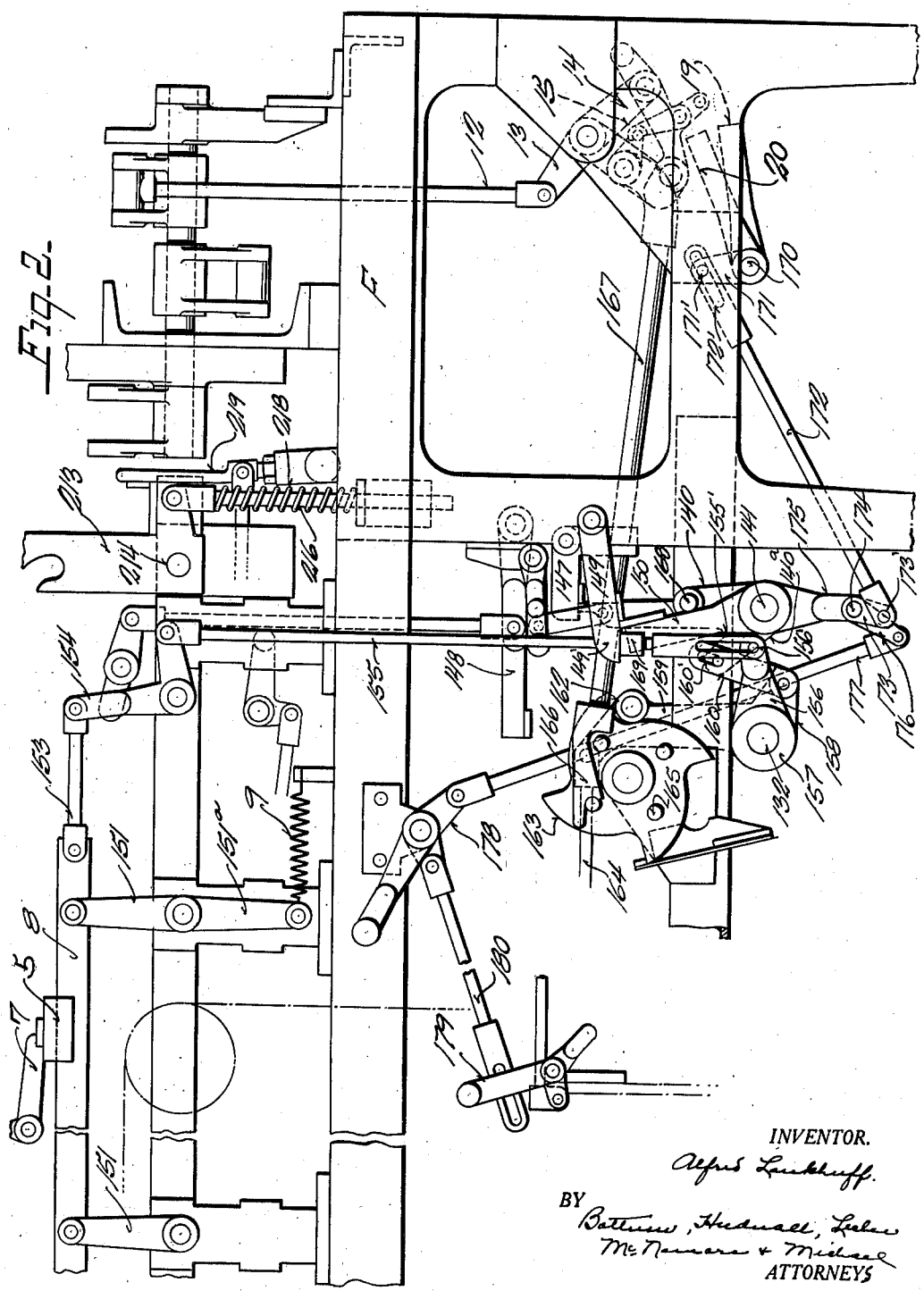

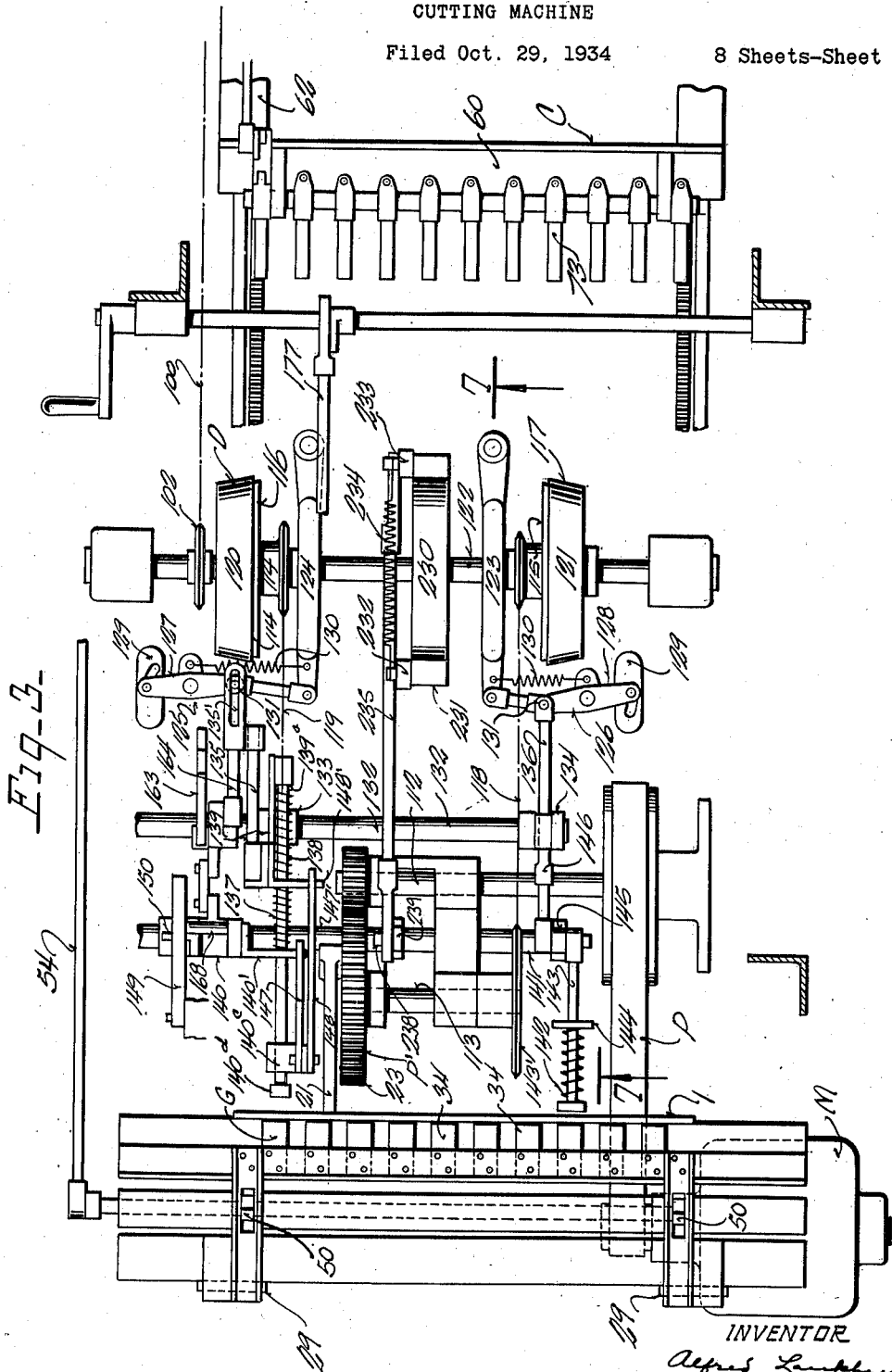

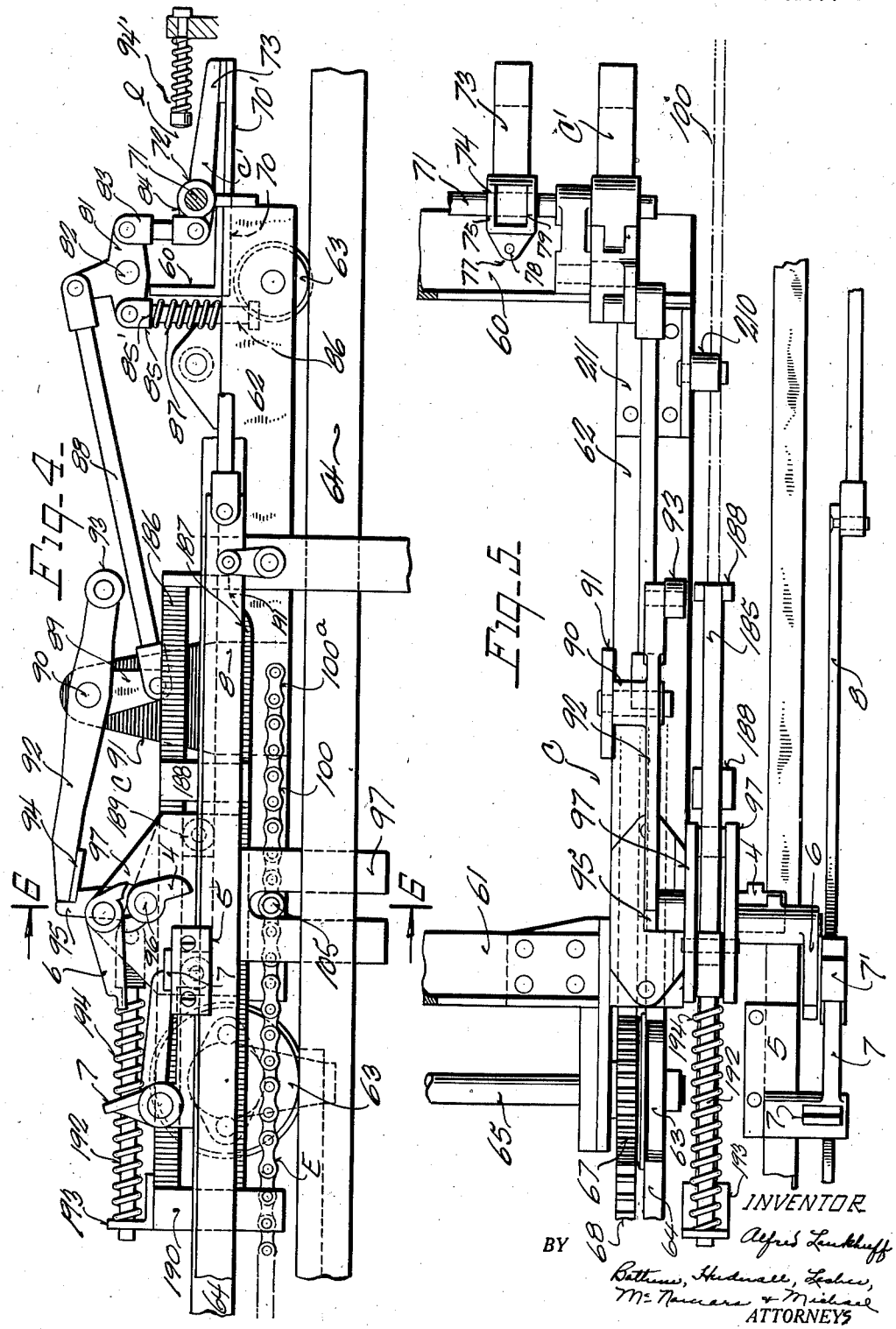

Aug. 8, 1939.   A. LAUKHUFF   2,168,415
CUTTING MACHINE
Filed Oct. 29, 1934   8 Sheets-Sheet 5
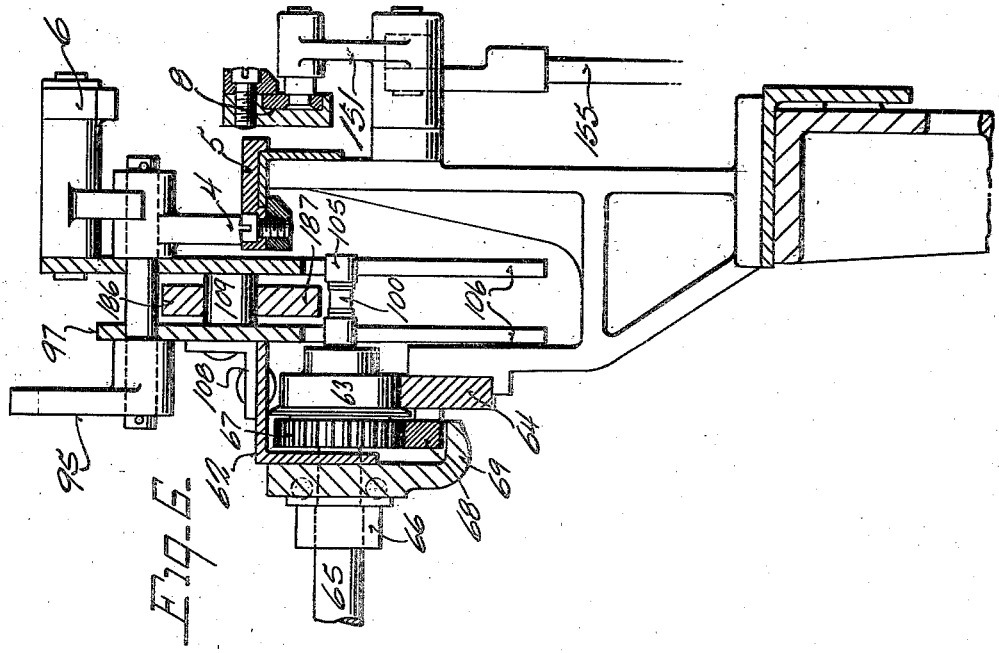
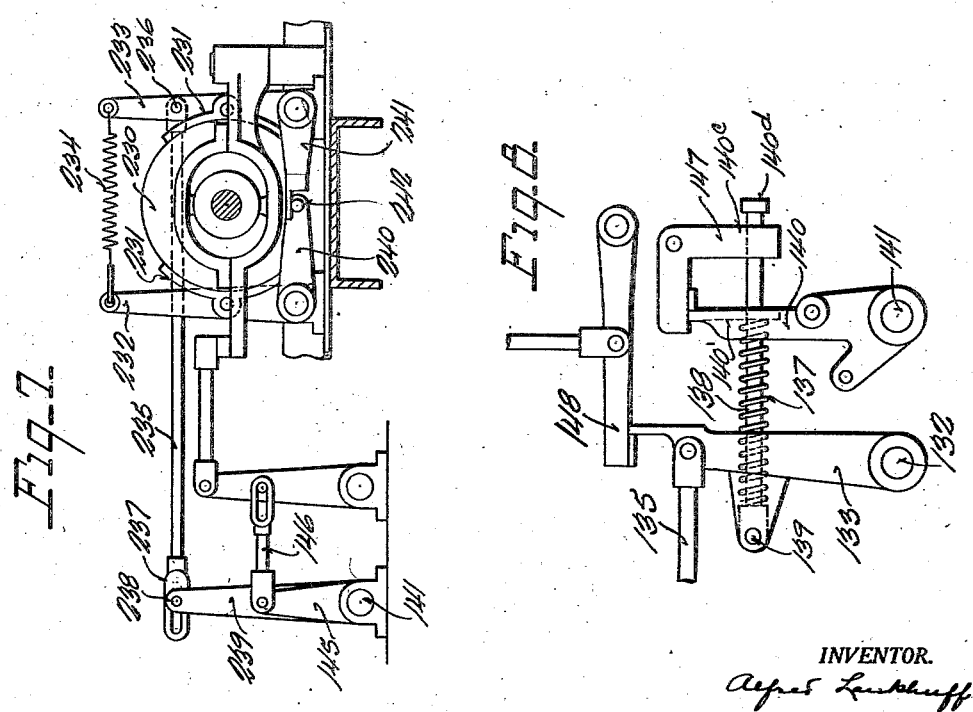
INVENTOR.
Alfred Laukhuff.
BY Bateman, Hiedwall, Leslie,
McNamara & Michael
ATTORNEYS Aug. 8, 1939.　　　　A. LAUKHUFF　　　　2,168,415
CUTTING MACHINE
Filed Oct. 29, 1934　　　　8 Sheets-Sheet 6
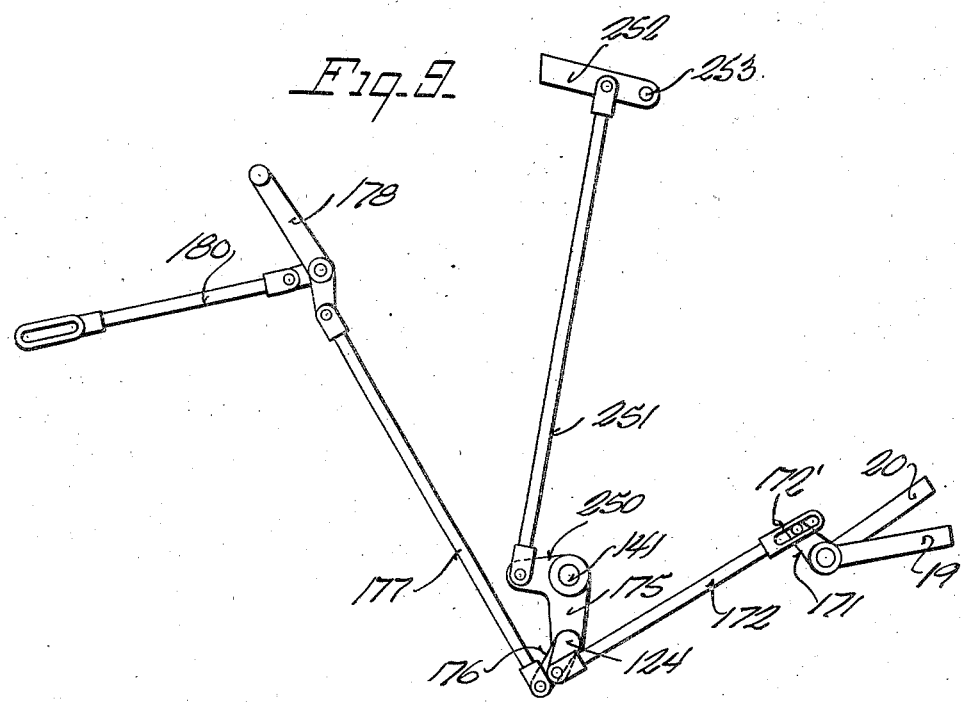
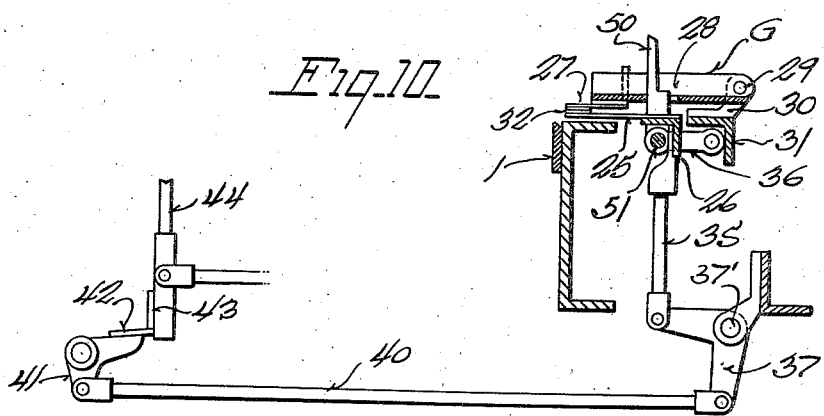
INVENTOR.
Alfred Laukhuff.
BY
ATTORNEYS

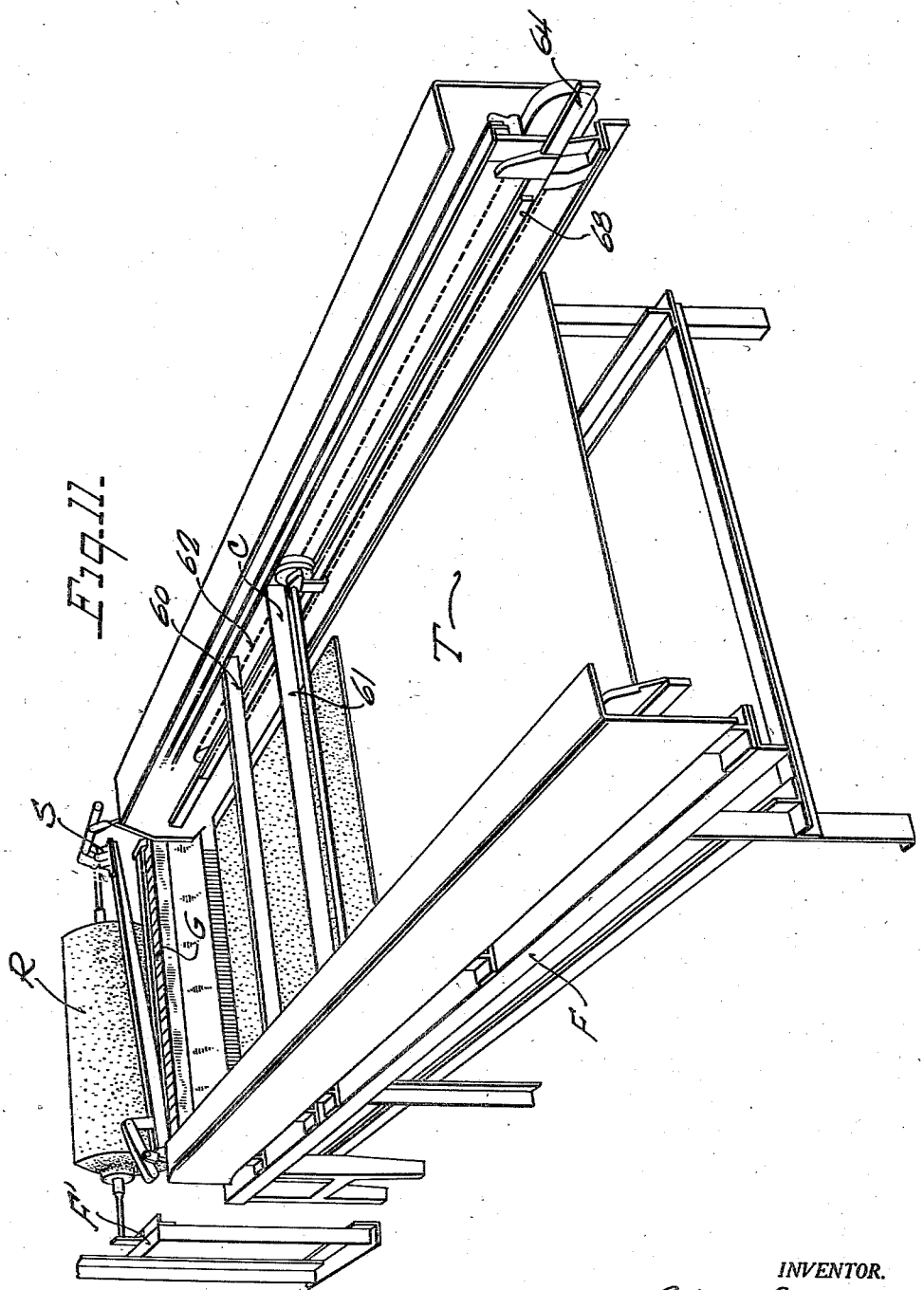

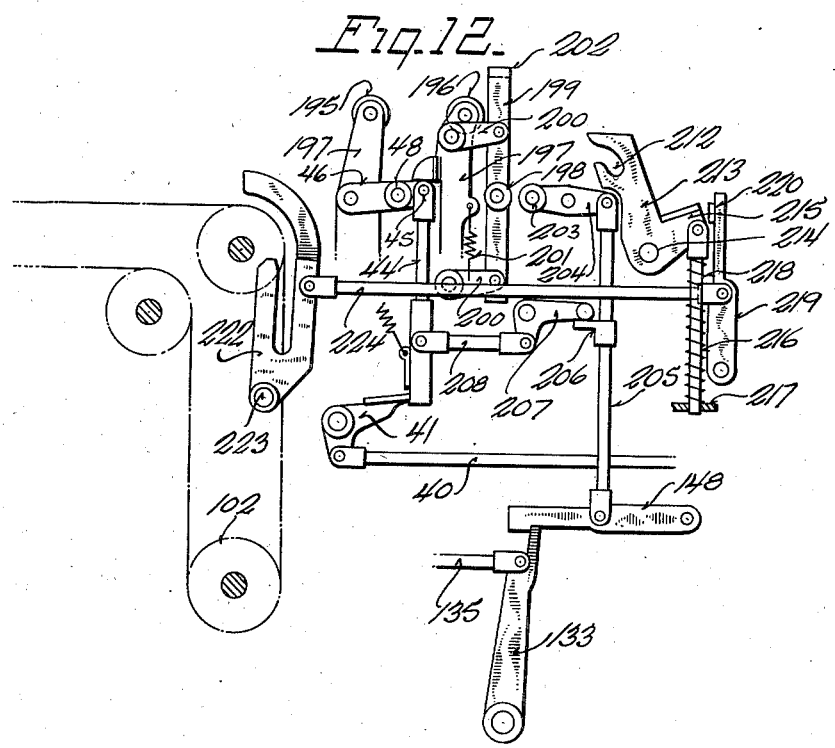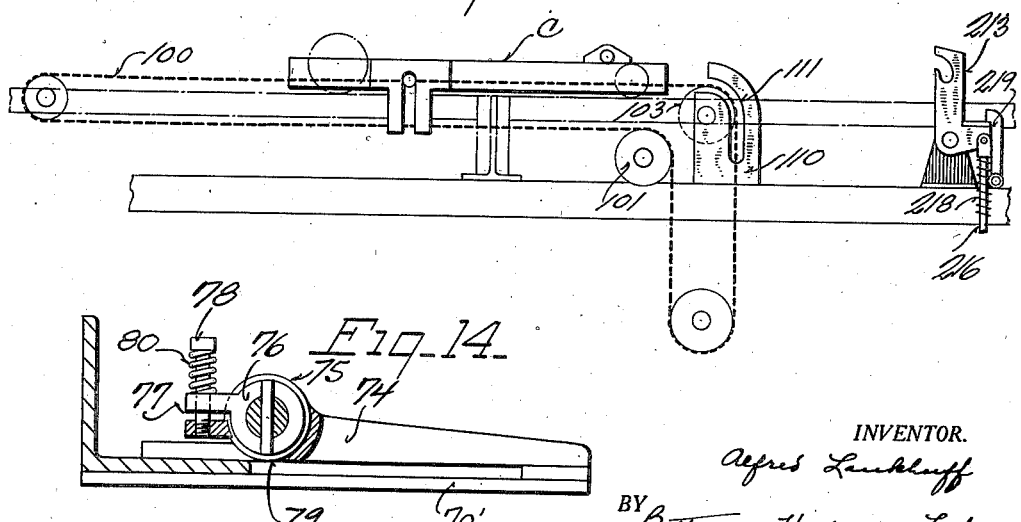

Patented Aug. 8, 1939

2,168,415

UNITED STATES PATENT OFFICE 2,168,415

CUTTING MACHINE

Alfred Laukhuff, Milwaukee, Wis., assignor to Alfa Machine Company, Milwaukee, Wis., a corporation of Wisconsin Application October 29, 1934, Serial No. 750,410

18 Claims. (Cl. 164—48)

This invention relates to a machine for cutting and stacking sheet-like material. Usually, the machine is employed for cutting a web of material fed from a roll thereof into sheets of selected lengths and as the sheets are cut they are laid down in a compact pile with one sheet lying flatly on the other. However, the machine may be advantageously employed for cutting sheet material of any kind or character in whatever manner it may be fed thereto. In any event, the important advantage of stacking as well as cutting into the desired length is had.

Other objects of the invention are to provide a machine of this character which may be readily adapted to cut sheets of any desired lengths, which performs the cutting operation rapidly and with precision, which is automatic in operation, and which in general is reliable, effective and satisfactory in use.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 1 is a fragmentary view partly in side elevation and partly in longitudinal vertical section showing a portion of the machine embodying the present invention;

Figure 2 is a fragmentary view in side elevation of the opposite side of the machine from that shown in Figure 1 and showing particularly the controls and auxiliary actuating devices operated from the cutter clutch;

Figure 3 is a fragmentary view partly in horizontal section and partly in top plan showing especially the reversible drive mechanism for the feed carriage, the controls for the friction clutches thereof, and associated parts;

Figure 4 is a fragmentary view in side elevation showing the feed carriage, its clamps and the control devices associated therewith;

Figure 5 is a fragmentary plan view of the part shown in Figure 4;

Figure 6 is a view taken in section on line 6—6 of Figure 4;

Figure 7 is a fragmentary view partly in side elevation and partly in section illustrating the brake employed for bringing the feed carriage to a stop on its out or feed stroke and also showing the brake operating mechanism;

Figure 8 is a fragmentary view in elevation illustrating the spring and latching arrangement employed for disengaging and engaging the other of the friction clutches of the reversible drive mechanism for the feed carriage;

Figure 9 is a fragmentary view in side elevation showing the safety stop for the carriage and the hand operated control lever for throwing out the cutter clutch;

Figure 10 is a fragmentary view partly in vertical section and partly in side elevation showing the feed clamp or gripper and associated parts;

Figure 11 is a perspective view showing the general construction of the machine;

Figure 12 is a diagrammatic view in side elevation showing certain of the control devices operated by the pusher bar or camming control member of the carriage;

Figure 13 is a similar view illustrating the sprocket drive chain and the manner of mounting and combining the same with the feed carriage;

Figure 14 is a detail view partly in vertical section and partly in side elevation showing the manner in which the movable fingers of the carriage grippers are mounted on and connected to their operating shaft; and Figure 15 is a fragmentary view in side elevation illustrating the yieldable connection in the motion transmission train between the trip bar and the latches of the feed clamps.

General construction of machine

The machine embodying the present invention comprises generally a suitable frame designated generally at F (see Figures 1 and 11) on which the various instrumentalities making up the machine are mounted. Adjacent one end of the machine is a cutter designated generally at S, preferably of the shear type, and having a fixed blade 1 secured to one of the cross members 2 of the frame F and also having a movable cutter or shear 3 overlying the fixed cutter 1 and movable down into cooperative relation therewith to effect the cutting:

The material to be cut is fed between the blades 1 and 3, usually from a roll R mounted for rotation in a suitable frame F' disposed adjacent the end of the frame F at which the cutter S is located. Located between the roll R and the cutter S and on the adjacent end of the frame F is a set of feed clamps or grippers designated generally at G. The function of these grippers G is to hold the material in proper position to be fed through the machine in the interval between each cutting operation and the subsequent feeding operation and also to hold the material while it is being cut.

The material is picked up from the feed clamps G and fed into the machine by means of a feed carriage designated generally at C and supported for reciprocatory movement in a horizontal path on tracks provided therefor on the frame F. A set of clamps or grippers C' are provided on the carriage C and engage the material as it is held in the feed clamps G and then when these feed clamps G are released and the carriage C partakes of feeding movement, the clamps C' pull the desired length of material through the feed clamps and through the blades of the cutter. When the desired length of material has been so pulled into the machine the clamps G are caused to grip the material, the carriage clamps C' to release it and almost simultaneously the cutter S is operated to sever a piece or length of the material from the web. The piece or length so severed falls or drops onto a flat support or table T provided therefor on the frame. Thus, the web is not only cut up into sheets of desired length but such sheets are stacked or laid flatly one upon another.

Provision is made for the automatic power operation of the various instrumentalities of the machine. In general, power is taken from an electric motor M or other suitable source of power and is transmitted to the cutter S and to the carriage C. The motion is transmitted to the cutter S through belt and pulley gearing P, spur gearing P' and a special type of cutter operating clutch 14, all to be hereinafter more fully described. The motion is taken to the carraige through a reversible drive mechanism D and a special endless chain carriage drive E.

Control and auxiliary actuating devices responsive to carriage and cutter clutch operation are provided to obtain the proper sequence and timing in the cycle of operation of the carriage C, feed and carriage clamps G and C' and cutter S. Thus, when the carriage, on its out or feed stroke, has drawn the desired amount of material into the machine, a trip 4 on the carriage engages a stop block 5 to release the carriage clamps C' and immediately thereafter a trip 6 on the carriage engages and releases a latch 7, previously engaged with a latch block 7', to free a trip bar and allow it, under the influence of its spring 9, to cause the feed clamps G to engage the fabric, and to set the cutter clutch 14 for operation, and thus cause the cutter to sever a sheet of fabric from the web. The closing of the feed clamps and the opening of the carriage clamps occur in such rapid sequence as to be practically simultaneous. On the return or ascending movement of the cutter, the driven member of the cutter clutch which moves with the cutter sets into operation another set of control and actuating devices designated generally at H and which will be hereinafter more fully described. For the present, it is sufficient to state that when these control and actuating devices are energized and set into operation by the driven member of the cutter clutch on the ascending movement of the cutter they operate to reset the trip bar 8, to throw out the cutter clutch and to reverse the carriage driven mechanism as well as to set or cock the mechanism, under the power of the clutch, for subsequent operations. Reversal of the carriage drive mechanism causes the carriage to return or move toward the cutter and feed clamps. As the carriage completes its return movement, a control and operating element thereon, which may be designated as a push bar or camming control element 10, trips or actuates a third series of control elements to cause the carriage clamps to grip the fabric, the feed clamps to release it and the drive mechanism for the carriage to be reversed so that the carriage moves on its outer feed stroke for a repetition of the cycle of operations.

*Cutter and its actuating mechanism*

The cutter S embodies the construction disclosed and claimed in my Patent No. 1,565,654, granted December 15, 1925, for Cutting machine, and reference is made to said patent for a detailed disclosure of the cutting machine.

For the purposes of the present case, it will be sufficient to note that it consists of the fixed blade 1 and movable blade 3, as above mentioned, with the movable blade secured to a vertical swingable blade or knife supporting bar 11. The knife supporting bar 11, through suitable levers, and a connecting rod 12 is actuated from the driven member 13 of the special type of clutch 14. This clutch 14 embodies a construction disclosed and claimed in my Patent No. 1,701,327, granted February 5, 1929, for a clutch. It has a driving member 15 which is constantly oscillated when the machine is in operation. A driven member 16 is cooperatively disposed with respect to the driving member and is interconnected or disconnected therefrom with a snap action in the manner disclosed in said Patent No. 1,701,327, under the influence of clutch operating abutments 19 and 20. The driving member of the clutch is oscillated by means of connecting rod 21 driven by a crank pin 22 projecting out from the face of the gear wheel 23 of the spur gear train P'.

*Feed clamps or grippers*

As shown in Figures 1, 3 and 10, the feed clamps or grippers G comprise a lower gripping plate 25 which is horizontally disposed and supported upon and fixed to a cross angle 26 disposed forwardly of the knife or cutter S. A cooperable clamping plate 27 is provided and is carried by channel bars 28 pivotally supported as at 29 on brackets 30 carried by an angle 31. The plates 25 and 27 may have friction facings such as felt strips 32 to better enhance their grip on the fabric. The weight of the upper clamping plate 27 and its bars 28, together with a spring 27', are utilized to cause the upper plate 27 to bear down against the lower plate 25 with sufficient force to grip the fabric. The plates 25 and 27 have their edges which lie adjacent the knife notched or cut out as indicated at 34 so as to expose portions of the fabric for direct gripping by the carriage clamps, as will hereinafter more fully appear.

The angle 26 is fastened to the upper ends of a pair of vertically disposed connecting rods 35, one at each side of the machine, and the lower ends of these connecting rods are pivotally connected to bell crank levers 37 fixed to a rock shaft 37' supported for rocking movement on the frame.

One of these bell crank levers 37 is pivotally connected to one end of a connecting rod 40, the other end of which is pivotally connected to one arm of a bell crank lever 41 fulcrumed for rotation on the machine and having a pawl 42 engageable with a latching shoulder 43 provided on the lower end of a vertically movable bar 44. The upper end of this bar 44 is pivotally connected as at 45 to one end of a lever 46 fulcrumed on the machine as indicated at 47 and having a roller 48 pivoted thereto and projecting laterally therefrom intermediate its ends.

When the roller 48 is depressed in a manner to be hereinafter more fully described, the bar 44 is moved downwardly and the bell crank lever 41 is rocked to pull the connecting rod 40 to the right as viewed in Figure 1, thereby so rocking the bell crank levers 37 as to elevate the connecting rods 35 and raise the plate 25. This movement of the plate 25 carries the upper plate 27 with it. When the plates have been fully elevated the upper plate is releasably secured in elevated position by means of latches 50 mounted on a cross shaft 51. It will be seen from the drawings that the latches 50 are shouldered and project up through openings 53 provided therefor in the bars 28. At one end the cross shaft 51 has a crank arm 52 connected thereto and to this crank arm is pivotally connected one end of a connecting rod 54, the opposite end of which is connected to the bell crank 55 by means of a yieldable coupling 54', which is in turn connected by a rod 56 to the trip bar 8.

When the carriage completes its outer stroke or feed stroke and the trip bar 8 is released it wings to the right as viewed in Figure 1 and pulls on the rods 56 and 54 to rock the shaft 51 and swing the latches 50 to released position thereby allowing the upper plate 27 to move down into gripping engagement with the fabric and hold it in position during the cutting operation and subsequently until it is again grasped by the carriage clamps. When the trip bar 8 is reset it tends to move the latches to latching position. However, this movement of the latches cannot occur at this time since the upper plate 27 is in its lower position but the operating force thus applied is stored in the spring of the yieldable connection 54' and automatically moves the latches into latching position when the upper plate 27 and its channel bars 28 are raised. When the roller 48 is depressed as it is when the carriage is completing its return movement or movement toward the knife the bar 44 is moved downwardly to rock the bell crank levers 41 and 37 and elevate both the upper and lower plates of the feed clamp. The latches 50 then snap into latching position under the bars 28 of the upper plate of the feed clamp. Upon completion of the return movement of the carriage the shoulder 43 of the vertical bar 44 is disengaged from the pawl 42 by swinging of the bar 44 to the left as viewed in Figure 1, in a manner which will be hereinafter more fully described. This permits the lower plate 25 of the feed clamp to drop and release the fabric, so that the carriage clamps, which have at this time engaged the fabric, may pull it through the feed clamp.

Feed carriage

The carriage C comprises a rectangular frame made up of a front cross angle 60, a rear cross angle 61 and side connecting angles 62, the side angles being securely fixed as by riveting or the like to the front and rear cross angles. Four traction rollers 63, two at each side of the machine, support the carriage for movement along its tracks 64. As illustrated in Figures 4, 5 and 6, the inner edges of the rollers 63 are flanged to maintain the carriage on its tracks. The rollers, of course, are rotatably interconnected with the side angles of the carriage and at least the rear pair are fastened to the ends of a cross shaft 65 journaled in bearings 66 provided on the side angles 62. On this shaft 65 two pinions 67 are secured, one adjacent each end of the shaft, and these pinions mesh with longitudinal racks 68 which extend parallel to and are fastened to the rails 64. The racks 68 and pinions 67 insure uniform movement of both sides of the carriage. To prevent the carriage from jumping off its tracks, hook-like retainers 69 are provided and are rigidly connected to the carriage from and having portions extending under the racks 68, as shown to advantage in Figure 6.

Carriage clamps or grippers

The carriage clamps C' are mounted on the front angle 60 of the carriage. These clamps comprise a lower clamping plate 70 secured to the underside of the horizontal flange of the front angle 60 and projecting forwardly therefrom, the projecting portion of the plate being, however, cut away to provide in effect a number of spaced lower gripping fingers 70'. Just above the forward edge of the angle 60 a shaft 71 is supported for rotation in bearing brackets 72. On the shaft 71 a plurality of gripping fingers 73 are provided and overlie the gripping fingers 70'. Each finger 73 has its rearward end in the form of a yoke 74, the arms of which are provided with openings in which the shaft 71 is rotatably fitted. At their rearward ends the arms 74 are cross connected by a web 75. In between the arms of each yoke a collar 76 is pinned to the shaft and has a rearwardly extending integral lug 77 overlying the web 75. A bolt 78 passes loosely through an opening 79 in the lug 77 and has its lower end threaded into the web 75. A coal spring 80 encircles the shaft of the bolt between its head and the lug 77. When the shaft 71 is rotated in a clockwise direction as viewed in Figure 14, it rocks the collars 76 with it and the collars acting through the springs 80 impart a similar movement to the gripping fingers 73 to bring them into gripping relation with respect to the fingers 70'. The springs 80 provide a certain amount of yieldability in the actuation of the gripping fingers to insure effective gripping action by all of the grippers, even though the fabric be of uneven thickness. To provide for operation of the shaft 71 and consequent opening and closing of the grippers, a three-arm lever 81 is fulcrumed as at 82 on a suitable bracket and has one arm connected by a link 83 with a crank lug 84 projecting rearwardly from the shaft 71. The other horizontal arm of this lever 81 is pivotally connected to the upper end of a stud 85, the lower end of which is slidable in a guide 86. A spring 87 encircles the stud 85 and bears at its lower end against one of the side channels 62 and at its upper end against a shoulder 85' provided on the stud 85. The spring tends to rock the lever 81 in a clockwise direction as viewed in Figure 4, thereby pushing downwardly on the link 83 and opening the grippers. To effect closing of the grippers a connecting rod 88 is pivotally connected at one end to the third arm of the lever 82 and is similarly connected at its other end to a crank lever 89 provided on a rock shaft 90 supported in suitable brackets 91 provided on the carriage. To this same shaft 90 an operating lever 92 is secured and is provided at one end with an anti-friction roller 93 and at its other end with a latching shoulder 94. Cooperable with the shoulder 94 is a latch 95 which is fixed on a rotatable shaft 96 mounted in bearings provided therefor in plates 97. On the outer end of this shaft 96 the trip 4 is secured. Above the trip 4 on this same plate 97 the trip 6 is also pivotally mounted.

With this construction, when the carriage in traveling through its feed stroke has pulled the desired amount of material through the feed clamps and into the machine, the trip 4 strikes the strike block 5 thereby rotating shaft 96 and swinging the latch 95 out from under the latching shoulder 94. This frees the operating lever 92 and allows the spring 87 to open the carriage grippers, that is, to swing the fingers 73 up away from the fingers 70'. However, when the carriage is completing its return movement, that is, its movement toward the knife, the roller 93 of the operating lever is depressed to close the carriage clamps or grippers, the gripping fingers 73 being brought down into gripping relation with respect to the gripping fingers 70', and the parts being held in such position by virtue of the latch 95 engaging the latching shoulder 94 under the influence of a bumper 94' provided on the frame. The friction between the parts is sufficient to maintain the latch in engagement with the operating lever 92 during the feed stroke of the carriage. The means for depressing the roller 93 will be hereinafter set forth.

*The carriage drive*

As shown in Figures 1 and 13, the carriage C is reciprocated or driven back and forth by means of a reversely movable endless sprocket chain 100 guided about guide or pulley sprocket wheels, 101, 102 and 103, and also meshed with a drive sprocket wheel 104. The idler and drive sprocket wheels are so positioned relative to each other as to cause the endless sprocket chain 100 to have horizontal runs 100ª and 100ᵇ and vertical runs 100ᶜ and 100ᵈ. The run 100ª of the sprocket chain 100 has a drive roller 105 connected therewith, the roller 105 having oppositely extending roller sections which project laterally beyond the chain and are a working fit in the slots 106 of the plates 97, the plates 97 thus also providing a drive bracket on the carriage. This drive bracket is made up of the two plates 97 and the means which spaces and secures them together and secures the assembly to the carriage. For this purpose an attaching angle or a plurality of attaching angle lugs 108 may be riveted to one of the side angles of the carriage and to one of the plates and the other plate may be secured in position by bolts and spacers 109. The drive chain 100 is alternately driven in opposite directions in a manner which will be hereinafter pointed out. When it has completed its motion in one direction, that is, in the direction to cause the return of the carriage, the drive bracket is transversely alined with a fixed slotted bracket 110 secured to the frame. The slot 111 of this fixed bracket has a curved portion 111ª and a straight vertical portion 111ᵇ. The edges of the curved portion are arcs of a circle concentric with the axis of rotation of the guide pulley 103. When the carriage approaches the end of its return movement, that is, its movement toward the cutter S and feed clamps G, the drive roller 105 rides over the guide sprocket 103 and in so doing rides through the curved portion 111ª of the fixed bracket 110 and down through the vertical portion 111ᵇ of this fixed bracket and also through the slots 106 of the drive bracket plates 97. As a result, the movement of the carriage within a short time is gradually reduced from chain speed to zero.

*Reversing drive mechanism for carriage drive sprocket chain*

The gear elements of the spur gearing P' are fixed on shafts 112 and 113 rotatably supported in suitable bearings provided therefor on the frame. These shafts rotate in opposite directions and are utilized to oppositely rotate the driven members 114 and 115 of friction clutches designated generally at 116 and 117. Chain and sprocket gearing 118 and 119 is employed to transmit the motion from the shafts to the driving members of the clutches 116 and 117, the driven sprockets of such chain and sprocket gearing being integral with or fixed to the driving members 114 and 115 of the friction clutches. Moreover, since the shafts 112 and 113 rotate at different speeds the chain and sprocket gearing 118 and 119 is so constituted or has such ratio as to drive the driving members 114 and 115 of the clutches 116 and 117 at the same speed. The driven members of the clutches 116 and 117 are designated at 120 and 121 and are pinned or otherwise suitably fixed to the shaft 122 on which both clutches are mounted. Shifting levers 123 and 124 are interconnected with the driving members 114 and 115 of the clutches in the usual manner so, as the shifting levers are swung in one direction or the other, they will cause the driving members 114 and 115 to engage or disengage the driven members 120 and 121, respectively. For moving the shifting levers, operating toggle mechanisms 125 and 126 are provided. These toggle mechanisms are of identical construction but are oppositely acting. In Figure 3, both toggles are shown in the position in which their respective clutches are disengaged or thrown out. Each toggle comprises toggle links 127 and 128, slotted bracket 129 to which link 127 is connected and a toggle spring 130 between the link 127 and the associated shifter lever. The links 127 and 128 are pivotally connected together as at 131. The springs 130 maintain their respective toggles in either of the two positions to which they may be adjusted.

Bearing in mind that in Figure 3 both toggles are shown as positioned when their respective clutches are disengaged, it will be understood that the clutch 116 may be engaged by pulling outwardly on the pivotal connection 131 between the links of toggle 125, whereas clutch 117 may be engaged by pushing inwardly on the pivotal connection between the links of the toggle 126.

It will be understood that when the clutch 116 is engaged the sprocket chain 100 is moved in such direction as to cause the carriage to partake of return movement, that is, to move in toward the cutter S and feed clamps G. On the other hand, when the clutch 117 is engaged the sprocket chain 100 is moved in such direction as to cause the carriage to partake of a feeding movement, that is, to move outwardly away from the knife to pull material through the feed clamps and between the blades of the knife or cutter.

*Mechanism for controlling clutches of reversible drive for carriage sprocket chain*

Adjacent the shaft 122 on which the clutches 116 and 117 of the reversible drive mechanism for the carriage drive sprocket chain are mounted is an opearting shaft 132 for the clutch operating toggles. Fixed to this shaft 132 and extending upwardly therefrom are crank arms 133 and 134, the crank arm 133 being disposed adjacent the toggle 125 and the crank arm 134 being substantially alined with the joint or knuckle 131 of the toggle 126. A connecting rod 135 has one end pivoted to the crank arm 133 and at its other end has a pin and slot connection 135' with the joint or knuckle 131 of the toggle 125. A connecting rod 136 has one end pivotally connected to the crank arm 134 and has its opposite end pivotally connected to the joint or knuckle 131 of the toggle 126. When the shaft 132 is moved in a clockwise direction as viewed in Figure 1, it pushes the connecting rods 135 and 136 to the right as viewed in Figures 1 and 3. This will engage the clutch 117 and disengage the clutch 116. This operation occurs when the movement of the carriage is reversed at the end of its return strokes to cause it to move away from the cutter and feed clamp and draw more material into the machine. On the other hand, when the shaft 132 is moved in a counter-clockwise direction as viewed in Figure 1, it will shift the connecting rods 135 and 136 to the left as viewed in Figures 1 and 3 with the result that the clutch 117 will be disengaged to stop the outward movement of the carriage. However, the clutch 116 will remain undisturbed, that is, disengaged, due to the provision of the pin and slot connection 135' between the connecting rod 135 and the knuckle or joint of its toggle 125. This is desirable since in this phase of the operation, the cutter must partake of the cutting stroke as will hereinafter more clearly appear.

The motion of the shaft 132 to throw in the clutch 117 and throw out the clutch 116 is imparted to the shaft from a coil spring 137 encircling a rod 138 which has one end pivotally connected as at 139 to a plate 139' fixed to the lever 133. The other end portion of this rod 138 extends through an opening provided in an abutment plate 140' fastened to or integral with the lever 140 loosely fitted on a second shaft 141 adjacent and parallel to the shaft 132. Both of the shafts 132 and 141 are rotatably mounted in suitable bearings provided therefor in the frame.

The motion imparted to the shaft 132 to disengage the clutch 117 is taken from a coil spring 142 encircling a rod 143 and having one end engaged with the head 143' of the rod and its other end engaged with an abutment 144 fixed to the frame. The end of the rod opposite its head is pivotally connected to a crank arm 145 fixed to the shaft 141 and this same crank arm is connected by a connecting rod 146 with the crank arm 134. When the spring 142 is permitted to expand it rocks the shaft 141 and the motion is transmitted through the connecting rod 146 to the shaft 132 and then through the connecting rod 136 to the operating toggle for the clutch 117.

There is one other clutch operation and that is the engagement of the clutch 116 to start the carriage back on its return movement. This is accomplished by taking motion directly from the cutter clutch and will be presently described in detail. It may also be well to bear in mind as the description proceeds that motion is taken from the driven member of the cutter clutch to compress or cock the springs 137 and 142 as well as to stretch or store energy in the retractile spring 9 which operates the trip bar.

When the springs 137 and 142 are compressed they are held against expanding until the proper time by suitable latches. Thus, the spring 137 is held under compression by means of latches 147 and 148 engaging shoulders 147' and 149' provided therefor on the levers 140 and 133, respectively. The rod 138 has one end extending through an opening in an arm 140ᶜ of the latch 147 and the adjacent end of this rod is provided with a head 140ᵈ so that when the latch 148 is released and the spring 137 pushes the lever 133 to the left as viewed in Figure 8, the head 140ᵈ of the rod 138 at the end of the stroke of the lever will trip the latch 147 in order to free the shaft 141 for subsequent operation under the influence of spring 142. This is necessary, notwithstanding that the lever 140 is loose on the shaft 141 for the reason that the lever 140 is interconnected with a lever 150 to be hereinafter described, in so far as motion in response to the action of spring 142 is concerned.

The spring 142 is prevented from expanding by means of a latch 149 engaging a lever 150 fixed to the shaft 141, this latch 149 and lever 150 holding the shaft 141 against movement in response to the spring 142 until the latch 149 is released.

The motion of the carriage is utilized through suitable intermediate instrumentalities to control the release of these latches 147, 148 and 149.

In certain phases of the operation, the carriage acts through the trip bar 8. This trip bar 8 extends along one side of the machine for a distance equal to the maximum distance through which the carriage moves and it is supported on the upper ends of links 151, at least one of which is extended beyond its lower pivot point, as indicated at 151ᵃ, and connected up to the spring 9 (see Figure 2), so that the spring 9 exerts a bias on the trip bar tending to swing the same rearwardly. It is necessary to have a trip bar substantially as long as the maximum stroke of the carriage to enable the stop block 5 to be positioned to vary the length of the stroke of the carriage and consequently the length of the sheet cut. The end of the trip bar 8 adjacent the cutter S is connected by means of a connecting rod 153 with one arm of a bell crank lever 154. The other arm of this lever 154 is connected to the upper end of a vertical connecting rod 155. This vertical connecting rod is on the outside of the frame of the machine and is provided with a slotted lower end 155' interconnected with a pin 156' projecting laterally from one arm 156 of a lever designated generally at 157. This lever 157 is loosely mounted on the shaft 132 and has two additional arms, one a relatively short arm 158 and the other a long upwardly extending arm 159. A link 160 has one end pivotally connected to the short arm 158 of the lever 157 and at its other end has a pin and slot connection 160' with an arm 140ᵃ of lever 140 on shaft 141. The long arm 159 of the lever 157 is provided adjacent its upper end with a laterally extending roller 162 which bears against the active peripheral surfaces of a four-lobed cam 163. The extreme upper end of this arm 159 is pivotally connected to the rearward end of a connecting rod 164, the forward end of which has a slotted connection 164' with the knuckle or joint 131 of the operating toggle 125 of clutch 116. The cam 163 is actuated from the driven member 13 of the cutter clutch 14. For this purpose the cam 163 is equipped with four pins 165 which are fixed thereto and project laterally from one face thereof. A pawl 166 successively engages these pins and pushes against them to rotate the cam. The pawl 166 is fixed to one end of a reciprocable shaft 167, the opposite end of which is connected to and accommodated by the driven member 13 of the clutch 14. It will be understood that when the driven member 13 moves in one direction to cause the knife to descend, the pawl 166 idles back over the pins 165 adjacent thereto, but when the driven member 13 of the clutch moves in the other direction as the movable blade of the cutter ascends it pushes against one of the pins and imparts a quarter revolution to the cam.

As pointed out, the lever 140 is loose on the shaft 141 but it has a laterally projecting pin 168 which engages behind the lever 150 fixed to this shaft 141. The latch 149 which engages the lever 150 to hold the shaft 141 against rotation has a forward end 149' which traverses the vertical connecting rod 155 and overlies a collar 169 fixed to this rod.

The operating abutments 19 and 20 of the cutter clutch 14 are fixed to a shaft 170 rotatably mounted on the frame. To this shaft a crank arm 171 is secured and is provided at its outer end with a crank pin 171' which is operatively fitted in the slot 172' of a connecting rod 172. The other end of this connecting rod is pivotally connected as at 173' to a crank arm 173 fixed to a rock shaft 174. This rock shaft 174 is pivotally supported in the lower end of a crank arm 175 fixed to the shaft 141. A lever arm 176 is also fixed to the rock shaft 174 and is pivotally connected at its outer end to the lower end of a connecting rod 177 which extends upwardly and is pivotally connected to one arm of a manual control lever 178. If desired, an additional manual control lever 179 may be provided at some remote point on the machine and connected to the lever 178 by a suitable system of links and levers diagrammatically illustrated at 180 in Figure 2.

With the construction as thus far described, when the carriage has traveled outwardly from the cutter on its feed stroke to the point where the trip 6 on the carriage engages and releases the latch 7 to free the trip bar 8, the trip bar moves to the left as viewed in Figure 2 under the influence of its spring 9 and this rocks the bell crank lever 154 in a counter-clockwise direction as viewed in Figure 2 and pulls upwardly on the vertical connecting rod 155. As the rod 155 moves up its collar 169 engaging the bifurcated end of the latch 149 lifts this latch out of engagement with the lever 150. This frees the shaft 141 for rotation and as the spring 142 has been previously compressed (as will be hereinafter pointed out) this spring expands, pulls rearwardly on the rod 143 to turn the shaft 141 in a counter-clockwise direction as viewed in Figure 1, thereby shifting the connecting rods 146 and 136 to the left as viewed in Figure 3 and tripping the toggle 26 to disengage the clutch 117. As a consequence, the drive of the carriage outwardly is arrested. This operation has involved also a rotation of the shaft 132 and a consequent movement of the connecting rod 135 to the right as viewed in Figure 3. However, this does not disturb the clutch 116 due to the provision of the slot 135' in this connecting rod 135.

Moreover, as the shaft 141 turns in the manner described, it swings the lever 175 in a counter-clockwise direction as viewed in Figure 2, thus moving the rock shaft 174 bodily and shifting the connecting rod 172 to the right. This motion of the connecting rod 172 shifts the clutch operating abutments 19 and 20 to a position where they are effective to cause the cutter clutch to be engaged. The cutter is now actuated and the movable blade descends and makes the cut. As it ascends the cam 163 is rotated a quarter revolution with the result that the cam acting on the roller 162 shifts the lever 159 to the right as viewed in Figure 2. This motion of the lever 159 is transmitted from its arm 158 through the link 160 and arm 140a to the lever 140 so that the lever 140 turns in a counter-clockwise direction as viewed in Figure 2. Now, while the lever 140 is loose on the shaft, nevertheless when partaking of this motion the shaft is turned since its pin 168 engages the back of lever 150 (fixed to shaft 141) and pushes this lever around in a counter-clockwise direction as viewed in Figure 2. This turning of the shaft 141 moves the crank arm 145 to the right as viewed in Figure 3 so as to cock or compress spring 142 for the next operation. The movement of the lever 140 also compresses or cocks spring 137 since one end of the spring is engaged by an abutment 140' moving with the lever 140 and the other end of spring 137 engages against an abutment 139a provided on the lever 133 which is at this time held against movement by the latch 148. This movement of lever 159 also resets the trip rod and again places its spring 9 under tension since such movement of lever 159 is accompanied by downward swinging of its arm 156, a downward movement of the vertical connecting rod 155 and corresponding movements in bell crank lever 154, rod 153 and trip rod 8.

It should also be noted when the lever 159 is swung to the right as viewed in Figure 2 under the action of the cam 163 it pulls the connecting rod 164 to the right and consequently trips the toggle mechanism 125 to cause it to engage the clutch 116, whereby return movement is imparted to the feed carriage and the feed carriage starts back toward the cutter.

*Brake for carriage drive mechanism*

In order to bring the carriage to a quick stop at the end of its outstroke, a brake drum 230 is fixed to the shaft 122 (see Figures 1, 3 and 7). Brake shoes 231 coact with the brake drum and are carried by brake levers 232 and 233. These brake levers are drawn toward each other by a spring 234, which spring functions in this way to cause the shoes 231 to apply braking pressure to the drum 230. A brake releasing rod 235 has one end pivotally connected as at 236 to the brake lever 233 and at its opposite end has a slot 237 receiving a pin 238 provided on the upper end of an operating lever 239 fixed to the shaft 141. At all times, except when the clutch 121 is disengaged to stop the feed stroke of the carriage, the lever 239 is maintained by the shaft 141 in the upright position shown in Figure 7, in which position the pin 238 engages the inner end of the slot 237 to hold the brake releasing lever against movement to the right and thereby maintain the lever 233 in released position, wherein the shoe 231 is disengaged from the brake drum. The levers 232 and 233 have rigidly connected therewith inwardly extending horizontal arms 240 and 241. The lever 240 is provided with a laterally extending pin 242 which engages under the reduced end 243 of the arm 241. It will be understood that when the brake releasing lever 239 holds the lever 233 in released position the arm 240 swings upwardly and its pin coacts with the extension 243 to cause the arm 241 to move upwardly and also release the brake lever 232 and its shoe 231. However, when the trip 6 engages the pawl 7 to release the trip rod 8 and the latch 149 is disengaged from the lever 150 to free the latch 141 and allow the spring 142 to disengage the clutch 117 and interrupt the drive of the carriage, the brake releasing lever 239 is permitted to move over to the left as viewed in Figure 7, thereby allowing spring 234 to draw the brake levers 232 and 233 together and cause the brake shoes 231 to engage the brake drum 230 and stop further movement of the feed carriage. At this time in the operation, the cutter clutch 14 is operated and consequently the cam 163 is actuated and lever 159 moved to the right as viewed in Figure 2. This acts through the crank or lever arms 158 and 140a and their connecting ring 160 to reset the shaft 141. This moves the brake operating lever 239 back to the position shown in Figure 7 and releases the brake.

*Carriage stop*

Provision is made for the positive prevention of the carriage or its grippers advancing into the field of action of the cutter during the operation of the cutter. In the normal operation of the mechanisms of the machine, the carriage is at the end of its outer feed stroke when the knife operates but should controls fail or improperly operate the possibility exists that the carriage might return to the end of its instroke when the knife is operating. This is precluded by the provision of a stop co-ordinated in its action with the operation of the cutter clutch. For this purpose the shaft 141 is provided with a lever 250 to the outer end of which a connecting rod 251 is pivotally secured. The upper end of this connecting rod 251 is pivotally attached to the intermediate portion of a stop or bumper 252 which may be in the form of a stop lever, one end of which is pivotally attached as at 253 to the frame and the other end of which is designed and positioned to engage a frame member of the carriage should the same advance toward the cutter while the latter is in operation.

*Pusher bar or camming member and instrumentalities controlled thereby*

A pusher bar or camming member 185 is mounted on the feed carriage at one side thereof and comprises upper and lower bars 186 and 187 (see Figure 4) vertically alined and held in spaced relation by connecting strips 188. The pusher bar or camming member 185 is disposed between the plates 97 of the driven member on the carriage and is supported on rollers 189 carried by these plates 97 and engaged between the upper and lower bars 186 and 187 of the pusher bar or camming member. In this way the pusher bar or camming member, while mounted on the carriage, may shift longitudinally with respect thereto. The rearward end of the pusher bar or camming member is interconnected with the sprocket drive chain 100 by means of a connecting bracket 190 and the point of connection of the pusher bar to the chain 100 is rearwardly of the connection of the chain with the carriage so that the pusher bar or camming member may move relative to the carriage under the drive of the chain after the carriage has stopped. The active or camming surface of the pusher bar is formed on the lower bar 187 and is designated at 191.

For the purpose of assisting in the return of the camming member 185 to its normal position after it has performed its functions, a rod 192 is pivotally connected at one end to the plates 97 and at its outer end slides through an angle lug 193 fixed to the camming member 185. A coil spring 194 encircles this rod 192 and abuts a shoulder on the rod at one end and the bracket 193 at its other end. With this structure, when the camming member is advanced with respect to the carriage the spring 192 is compressed. On the feed stroke of the carriage the spring functions to restore the pusher bar or camming member to its normal position.

As the carriage approaches the end of its return movement, the upper bar 186 of the pusher bar or camming member 185 rides under rollers 195 and 196 mounted on brackets 197 carried by the frame, so as to positively hold the pusher bar down during its active operation. The active camming surface 191 of the pusher bar first rides over roller 48 to depress this roller and the connecting rod 44, thereby rocking the bell cranks 41 and 37 and raising the lower clamping plate of the feed clamp into gripping engagement with the fabric.

The camming surface 191 of the camming control member 185 next rides over a laterally and inwardly projecting roller 198 provided on a bar 199. The bar 199 is mounted on a pair of links 200 pivoted to the frame and one of the brackets 197. A spring 201 holds the bar 199 elevated. The upper end of this bar is inturned as at 202 and when the roller 198 is depressed by the camming surface 191, this inturned upper end of the bar is located over the carriage clamp operating lever 92 and swings this lever 92 to cause the carriage clamps to come into gripping engagement with the fabric in which position they are latched by the latch 95. As the pusher bar completes its movement toward the cutter, the camming surface 195 engages a roller 203 provided on one end of a lever 204. The other end of this lever 204 is connected by a rod 205 with the latch 148 and as the roller 203 is depressed the rod 205 is raised to release the latch 148 to allow the spring 137 to rock the shaft 132 in a clockwise direction as viewed in Figure 1, thereby moving the rods 135 and 136 to the right as viewed in Figure 3, and consequently engage the clutch 117 and disengage the clutch 116. Such operation of the clutches reverses the drive of the carriage so that the drive which has been causing the carriage to move toward the cutter is interrupted and a drive applied to cause the carriage to move away from the cutter on its feed stroke. When the bar 205 is raised, a lug 206 thereon rocks a bell crank lever 207 to pull a connecting rod 208 to the left as viewed in Figure 1, thereby disengaging the latches 42 and 43 and permitting the lower clamping plate of the feed clamp to drop, thereby releasing the grip of the feed clamp on the fabric and permitting the fabric to be pulled freely through the feed clamp.

*Carriage lock and pusher*

When the carriage approaches the end of the return stroke, that is, when it is partaking of its final movement toward the cutter S, a roller 210 projecting laterally outwardly from a bracket 211 fixed to one of the side angles of the carriage, enters the inwardly and then downwardly extending groove 212 of a lock hook 213 pivotally mounted as at 214 on the frame. This hook has a lever arm 215 extending at an angle therefrom and pivotally connected to the upper end of a guide rod 216 loosely and slidably fitted in a guide 217 provided on the frame. A spring 218 is interposed between the guide 217 and a shoulder on the rod and tends to maintain the lock hook in the position shown in Figure 1. When, however, the roller 211 enters the groove 212 the lock hook is swung to a vertical position against the action of spring 218 and it is latched in this position so that the carriage is momentarily securely held in proper position. The latch for holding the hook at this time is designated at 219 and has a latching shoulder 220 at one end, which engages over the arm 215 of the lock hook. The opposite end of the latch 219 is fulcrumed as at 221 on the frame. The latch is brought to latching position by means of a slotted operating plate 222 pivotally supported adjacent the slotted plate 110 as indicated at 223 and connected by a rod 224 with the latch 219. The weight of the plate 222 maintains the latch in unlatched or inoperative position but when the drive roller 105 rides down in the vertical portion of the slot 111 it coacts with the slot of the plate 222 to swing the plate over to the right as viewed in Figure 1 and thereby move the latch 219 to latching position. When the drive for the carriage is reversed and the roller 105 moves out of the slotted plate 222, the latch is released and the spring 218 expands to release the carriage and also give to it an impetus supplemental to the action of the drive. This arrangement is provided at one side only of the machine. A suitable spring bumper may be provided at the other side.

Summary of operation

With the machine in operation, it will be understood that the feed clamps G grip the fabric and hold it in position to be picked up by the carriage clamps C' when the carriage has completed a return stroke. These carriage clamps are automatically engaged with the fabric by virtue of the cooperation of the inturned upper end 202 of the bar 189 with the carriage clamp operating lever 92. Immediately following this, the camming surface on the pusher bar 185 depresses the roller 203 and thereby releases the latch 148 and allows the spring 137 to rock the lever 133 and reverse carriage drive. At the same time the projection 206 on the connecting rod 205 operates to allow the lower plate 25 of the feed clamps 43 and 42 to drop down. The material is now under the control of the carriage clamps. The carriage then moves out on its feed stroke and at the end of its feed stroke the trip 6 releases the pawl 7, allowing the trip bar 8 to swing under the influence of its spring. Such movement of the trip bar releases the latches 50 to allow the feed clamp to grip the fabric. At this time the carriage clamps C' are also released by the cooperation of trip 4 with stop block 5. The movement of the trip bar also raises the vertical connecting rod 155 to release the latch 149 and allow the shaft 141 to swing to the right as viewed in Figure 2 under the influence of its spring 142. This throws out the clutch 117 and since the lever 175 moves with the shaft 141 the clutch operating abutments 19 and 20 are shifted to throw in the cutter clutch. The knife now descends and severs the sheet of material from the web and the sheet drops down onto the table T. As the knife descends on its return stroke, the cam 163 is operated from the driven member of the clutch. Movement of the cam 163 shifts the lever 159 under clutch power to the right as viewed in Figure 2. Such movement of the lever 159 acts through its connecting rod 164 to engage the clutch 116, thereby imparting an in or return stroke to the carriage. This movement of the lever 159 also results in a repositioning of the shaft 141 and consequent cocking or compression of the springs 137 and 142. Incidentally the trip bar 8 is reset because the lever arm 156 travels with the shaft 132. The motion of the lever 159 which is loose on shaft 132 is carried over to the shaft 141 through the crank arms or lever arms 158, 140a and link 160 and is carried back to the shaft 132 by the levers 145 and 134 and their connecting rod 146. The cycle of operations is then repeated.

While I have shown and described one construction in which the machine may be advantageously embodied, it is to be understood that the construction shown has been selected for purposes of illustration or example and that various changes in the size, shape and arrangement of the parts may be made without departing from the spirit of the invention or the scope of the subjoined claims.

The invention claimed is:

1. A machine of the character described comprising a cutter, a feed carriage movable toward and from the cutter, grippers on the carriage for engaging the material to be cut and drawing the same past the cutter, feed clamps on the forward side of the cutter and including upper and lower clamping plates movable toward and away from each other and engageable with the material to hold the same in position for engagement by the grippers of the carriage and while it is being cut, and means for co-ordinately actuating the carriage, carriage grippers, feed clamps and cutter whereby to cause the grippers of the carriage to release and the feed clamps to clamp the material at the completion of the outstroke of the carriage and thereupon cause the cutter to operate and also to cause the feed clamps to release and the carriage grippers to grip the material at the completion of each instroke of the carriage, said carriage being moved at a substantially constant rate of speed.

2. A machine of the character described comprising a cutter, a feed carriage movable toward and away from the cutter and having means thereon for engaging the material and feeding the same past the cutter, feed clamps engageable with the material to hold it in position for engagement by said means on the carriage and while it is being cut, a power operated clutch for actuating said cutter, a reversible drive mechanism for said carriage, and means actuated by the clutch and controlled by movements of the carriage for regulating the action of said feed clamps, of the said means on said carriage, of said clutch and said reversible drive mechanism.

3. A machine of the character described comprising a cutter, a feed carriage movable toward and away from the cutter and having means thereon for engaging the material and feeding the same past the cutter, an endless flexible element, means for establishing a driving relation between the endless flexible element and the carriage to cause the carriage to be reciprocated by said endless flexible element and yet allow the endless flexible element to move relative to the carriage when the carriage completes its stroke in either direction, and a reversing drive mechanism for said endless flexible element.

4. In a machine of the character described having a reciprocable feed carriage, a slotted drive bracket interconnected with said carriage and a reversely movable endless flexible drive element, means for guiding said flexible drive element to constrain the same to movement in a path parallel to the path of movement of the carriage and to movement in a path transverse thereto, and a drive roller connected to said endless flexible drive element having a working fit in and slidable lengthwise of the slot of said drive bracket and effective to reciprocate the carriage when moving in a path parallel to the path of movement of the carriage and to allow the carriage to remain stationary when moving in a path vertically transverse thereto.

5. In a machine of the character described having a reciprocable feed carriage, a slotted drive bracket interconnected with said carriage and a reversely movable endless flexible drive element, means for guiding said flexible drive element to constrain the same to movement in a path parallel to the path of movement of the carriage and to movement in a path vertically transverse thereto, a drive roller connected to said endless flexible drive element having a working fit in the slot of said drive bracket, and a fixed slotted bracket disposed to be transversely alined with the slotted bracket of the carriage at one end of the carriage movement, said drive roller moving in the slots of both brackets when the carriage is at one end of its stroke.

6. In a machine of the character described, a feed carriage, means for reciprocating the same comprising a slotted bracket on the feed carriage, an endless flexible drive element, guide pulleys constraining said flexible drive element to travel in runs parallel to the path of movement of the carriage and runs transverse to the path of movement thereof, and a drive roller connected to said flexible drive element and shiftably interfitted with the slot of said drive bracket and effective to reciprocate the carriage when moving in a path parallel to the path of movement of the carriage and to allow the carriage to remain stationary when moving in a path vertically transverse thereto.

7. A machine of the character described comprising a cutter, a feed carriage reciprocable with respect thereto, carriage grippers on said carriage for engaging the material and feeding the same past the cutter, feed clamps engageable with the material to hold it in position for engagement by said carriage grippers and while it is being cut, a power operated clutch for actuating said cutter, a reversible drive mechanism for said carriage, a trip bar controlled by the carriage and regulating certain phases of the operation of said clutch, said reversible drive mechanism and said feed clamps, and means also controlled by the movement of the carriage for regulating the other phases of the operation of said feed clamp and of said reversible drive mechanism.

8. A machine of the character described comprising a cutter, a feed carriage reciprocable with respect thereto, carriage grippers on said carriage for engaging the material and feeding the same past the cutter, feed clamps engageable with the material to hold it in position for engagement by said carriage grippers and while it is being cut, a power operated clutch for actuating said cutter, a reversible drive mechanism for said carriage, means controlled by the movement of the carriage for regulating the action of the clutch, feed clamps, carriage grippers and reversible drive mechanism and including a pusher bar mounted on the carriage and movable therewith, and means actuated by said pusher bar for effecting said control in certain phases of the operation.

9. A machine of the character described having a feed carriage and a reciprocable drive mechanism therefor, a bumper cooperable with the carriage at one end of its stroke for arresting movement thereof and holding it in position, a spring associated with the bumper and compressed thereby when the bumper is engaged by the carriage, means for latching the bumper in position to hold the carriage, and means for releasing said latch at the proper time, said spring imparting an initial impetus to the carriage when said latch is released.

10. In a machine of the character described, a reciprocable feed carriage, carriage grippers thereon, spring means for biasing said grippers to open position, a latch for securing the grippers in closed position, and means operable when the carriage has completed a predetermined movement in one direction for tripping said latch.

11. A machine of the character described comprising a cutter, a reciprocable feed carriage movable toward and away from the cutter and having means thereon for clamping material and feeding the same past the cutter, feed clamps on the opposite side of the cutter for holding the material in position for engagement by said means and also while it is being cut, reversible drive means for actuating said carriage, a pusher bar mounted on the carriage for movement therewith and also for limited movement relative thereto, a connection between said reversible drive and said pusher bar, and means actuated by the pusher bar for causing the first-mentioned means to grip the material and the feed clamps to release the same.

12. A machine of the character described comprising a cutter, a reciprocable feed carriage movable toward and away from the cutter and having means thereon for clamping material and feeding the same past the cutter, feed clamps on the opposite side of the cutter for holding the material in position for engagement by said means and also while it is being cut, reversible drive means for actuating said carriage, a pusher bar mounted on the carriage for movement therewith and also for limited movement relative thereto, a connection between said reversible drive and said pusher bar, means actuated by the pusher bar for causing the first-mentioned means to grip the material and the feed clamps to release the same, and mechanism associated with said last-named means and also controlled by the pusher bar for causing the drive mechanism to reverse the carriage as it completes its movement towards the knife.

13. A machine of the character described comprising a cutter, a reciprocable feed carriage movable towards and away from the cutter, grippers on the feed carriage for clamping material and feeding the same past the cutter, feed clamps on the opposite side of the cutter for holding the material in position for engagement by said grippers and also while it is being cut, reversible drive means for actuating the carriage, a device on the carriage effective to cause the grippers to engage the material and the feed clamps to release it when the carriage reaches the end of its stroke towards the cutter, and means operated when the carriage reaches the limit of its stroke away from the cutter to cause the feed clamps to grip the material and the grippers on the carriage to release it.

14. A machine of the character described comprising a cutter, a reciprocable carriage movable toward and away from the cutter and having means thereon for gripping the material and feeding it past the cutter, a reversible drive mechanism for the carriage including oppositely acting clutches, one effective to move the carriage in one direction and the other effective to move the carriage in the opposite direction, means for actuating the knife including a power operated clutch, a spring, lever and latch arrangement for controlling the action of said oppositely acting clutches, means effective upon operation of said power operated clutch to cock said springs and means controlled by movements of the carriage to regulate the action of the clutches.

15. A machine of the character described comprising a cutter, a reciprocable feed carriage movable toward and away from the cutter, grippers on the carriage for engaging the material to be cut and drawing the same past the cutter, feed clamps on the opposite side of the cutter from that on which the carriage is located and engageable with the material to hold the same in position for engagement with the carriage grippers and also while it is being cut, means including a power operated clutch for actuating the cutter, a reversible drive mechanism for reciprocating the carriage and control mechanism for regulating the action of the reversible drive mechanism and of the clutch and comprising auxiliary actuating devices energized by clutch movements, and control devices for the actuating devices regulated in their action by the movements of the carriage and by said clutch.

16. A machine of the character described comprising a cutter, a reciprocable feed carriage movable toward and away from the cutter, grippers on the carriage for engaging the material to be cut and drawing the same past the cutter, feed clamps on the opposite side of the cutter from that on which the carriage is located and comprising upper and lower gripping plates biased into gripping engagement with the material to be cut to hold the same in position for engagement by the carriage grippers and also while being cut, latches for releasably securing said plates in spaced relation to release the material from the clamping action of said plates, and means controlled by the movements of the carriage to regulate the action of said latches and said plates.

17. A machine of the character described comprising a cutter, a reciprocable feed carriage movable toward and away from the cutter, grippers on the carriage for engaging the material to be cut and drawing the same past the cutter, feed clamps on the opposite side of the cutter from that on which the carriage is located and comprising upper and lower gripping plates supported for vertical movement and for movement toward and away from each other whereby the plates are engageable with and disengageable from the material passing therebetween, said plates being biased into clamping engagement with the material, latches for maintaining the upper plate in elevated position whereby when the lower plate is lowered and the upper plate so latched the feed clamps will release the material, means for releasing the latches to allow the feed clamps to grip the material, and means for raising and lowering the lower plate.

18. A machine of the character described comprising a cutter, a reciprocable feed carriage movable toward and away from the cutter, grippers on the carrier for engaging the material to be cut and drawing the same past the cutter, feed clamps on the opposite side of the cutter from that on which the carrier is located and comprising upper and lower gripping plates biased into gripping engagement with the material to be cut to hold the same in position for engagement by the carriage grippers and also while being cut, latches for releasably securing said plates in spaced relation to release the material from the clamping action of said plates, and means controlled by the movements of the carriage to regulate the action of said latches and said plates, the edges of the plates adjacent the cutter being notched to expose the material for direct gripping by the carriage grippers.

ALFRED LAUKHUFF.